C. H. MANNING.
Carbon-Points for Electric-Lights.

No. 220,248. Patented Oct. 7, 1879.

WITNESSES
F. S. Blanchard
W. A. Redmond

By

INVENTOR,
Chas. H. Manning

ATTORNEYS.

UNITED STATES PATENT OFFICE.

CHARLES H. MANNING, OF WASHINGTON, DISTRICT OF COLUMBIA.

IMPROVEMENT IN CARBON POINTS FOR ELECTRIC LIGHTS.

Specification forming part of Letters Patent No. 220,248, dated October 7, 1879; application filed October 26, 1878.

*To all whom it may concern:*

Be it known that I, CHARLES H. MANNING, of Washington, in the county of Washington and District of Columbia, have invented a new and useful Improvement in Carbon Points or Plates for Electric Lights, of which the following is a specification.

The invention relates to ever-pointed burners for electric lights.

The object of my invention is to provide ever-pointed and thin-edged material for combustion by electricity for electric lights.

As the solid points and plates of carbon now in use present too much body for free ignition, the electric current finds an obstacle in circulating more than a few inches from the base, and the points often burn down on one side only, leaving the other to cast a shade, and in single small sticks or points burn too rapid to answer the requirements. My method is designed to obviate this difficulty.

The invention consists in the arrangement of carbon or other fit material in rods or threads as small as can be readily made and secured in bundles by consolidating them at the base only with gluten or its equivalent, said bundles to be used separately, as wicks in tubes, or collectively, to form a carbon brush to take the place of carbon plates, points, or candles, now used.

The invention also consists of perforating longitudinally carbon points fastened at their bases to form carbon plates, so as to present thin edges or ends for combustion, and in filling these perforations with incandescent matter.

The invention also consists in forming books of thin leaves of carbon or other fit material, and alternating with leaves of incandescent matter.

Figure 1:
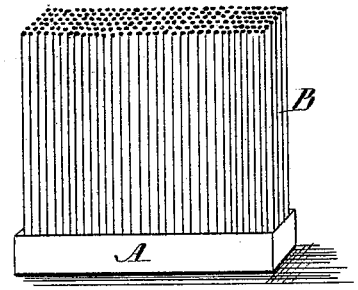
Figure 2:
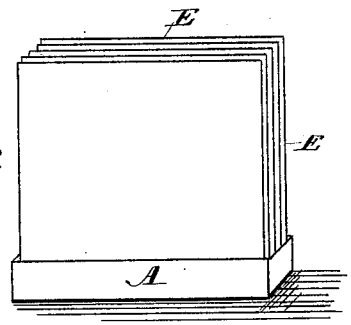
Figure 6:
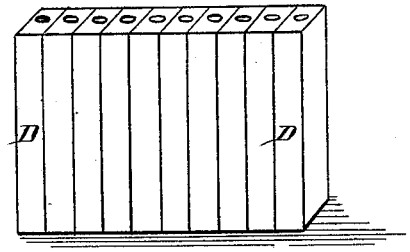
Figure 3:
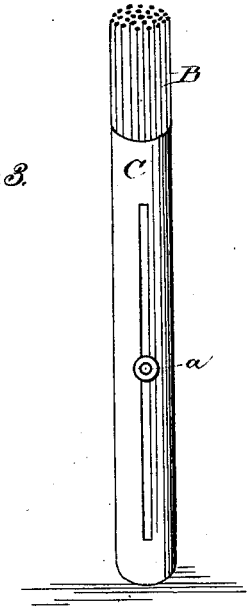
Figure 4:
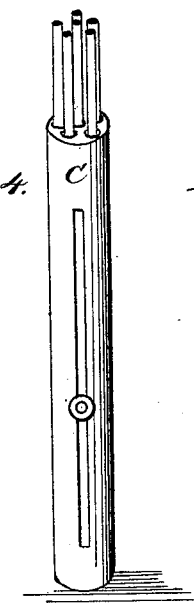
Figure 5:
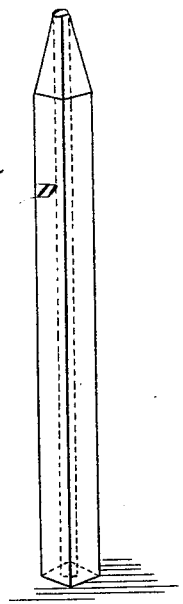

In the drawings, Figure 1 is a view of the carbon points or threads arranged in the form of a brush. Fig. 2 represents a series of carbon leaves or book with incandescent material between each leaf. Fig. 3 represents a series of perforated carbon points consolidated at their bases. Fig. 4 represents my carbon points or candle within a tube and the means of projecting them forward for combustion. Fig. 5 shows a negative candle, so arranged that the perforated disk admits but a certain number to the action of the electric flame when desired. Fig. 6 shows one of my carbon points as combined in Fig. 3, separately, with its perforations for receiving the wires near the point of ignition, and that they may slide thereon.

C in the drawings represents a tube containing a bundle of carbon sticks or threads and one or more of incandescent matter consolidated at the base only by any adhesive matter, making them solid there, forming a wick for the metal case, to be used as candles side by side or point to point.

In Fig. 5 is shown a perforated disk, *b*, and through which a less number of carbon points are projected for the negative pole, which burns slower than the other. These carbon points are moved forward as combustion proceeds by slide *a*, or any operative mechanism desired.

B represents the carbon wicks, arranged into a compacted brush or plate, and united solidly at the base.

D represents a perforated carbon point, perforated longitudinally and presenting thin edges or ends for combustion, and these perforations may be filled with incandescent matter. These perforated points I propose to form into plates by consolidating them at their bases, as shown in Fig. 3, whenever desired.

E E, Fig. 2, are a series of carbon plates or leaves, formed from a single block of carbon, or united to each opposite leaf by a shoulder on the lower end of the same, so as to allow an intermediate space between each leaf, which may be filled with incandescent matter.

Having described my invention, what I claim, and desire to secure by Letters Patent, is—

1. An electrode for electric lights, consisting of a book of thin leaves or sheets of carbon or other material consolidated at the base, for the purpose specified.

2. The combination of an electrode consisting of a book of thin leaves or sheets of carbon or other material consolidated at the base with intermediate leaves of incandescent matter, substantially as described.

3. An electrode of carbon or other material fit for electric lights, consisting of a book of thin leaves consolidated at the base and formed into points or rods corresponding to the teeth of a comb, for the purpose specified.

4. A receptacle for carbon points or wires, or electrodes having a perforated disk or plate, and an actuating device for moving said electrodes, substantially as shown and described.

CHAS. H. MANNING.

Witnesses:
S. WOLF,
WM. BLACKSTOCK.